(12) United States Patent
Tanner

(10) Patent No.: US 9,162,822 B2
(45) Date of Patent: Oct. 20, 2015

(54) CLAMPING CONVEYOR HAVING A TENSIONING APPARATUS

(71) Applicant: M. Tanner AG, Illnau (CH)

(72) Inventor: Marcel Tanner, Bassersdorf (CH)

(73) Assignee: M. Tanner AG, Lllnau (CH)

( * ) Notice: Subject to any disclaimer, the term of this patent is extended or adjusted under 35 U.S.C. 154(b) by 0 days.

(21) Appl. No.: 14/484,858

(22) Filed: Sep. 12, 2014

(65) Prior Publication Data

US 2015/0075947 A1    Mar. 19, 2015

(30) Foreign Application Priority Data

Sep. 16, 2013    (CH) ........................................ 1588/13

(51) Int. Cl.
  *B65G 15/14*    (2006.01)
  *B65G 17/32*    (2006.01)
  *B29C 49/42*    (2006.01)
  *B65G 23/44*    (2006.01)

(52) U.S. Cl.
  CPC .......... *B65G 17/323* (2013.01); *B29C 49/4205* (2013.01); *B65G 15/14* (2013.01); *B65G 23/44* (2013.01); *B65G 2201/0247* (2013.01)

(58) Field of Classification Search
  CPC ...................................................... B65G 15/14
  See application file for complete search history.

(56) References Cited

U.S. PATENT DOCUMENTS

| | | | | |
|---|---|---|---|---|
| 3,802,549 A | * | 4/1974 | Kinsey | 198/404 |
| 3,961,705 A | * | 6/1976 | Suciu | 198/402 |
| 4,137,759 A | * | 2/1979 | Talbert | 73/862.392 |
| 5,722,218 A | * | 3/1998 | Lerner | 53/459 |
| 5,743,070 A | * | 4/1998 | Lerner et al. | 53/459 |
| 6,200,036 B1 | * | 3/2001 | Girardey | 384/260 |
| 7,574,845 B2 | * | 8/2009 | Varhaniovsky | 53/426 |
| 7,861,852 B2 | * | 1/2011 | Klaiber et al. | 198/626.1 |
| 8,328,005 B2 | * | 12/2012 | King | 198/810.04 |
| 8,878,109 B2 | * | 11/2014 | Mackay et al. | 219/679 |
| 2006/0183585 A1 | * | 8/2006 | Fairchild | 474/101 |
| 2008/0017481 A1 | | 1/2008 | Benning | |
| 2011/0077115 A1 | * | 3/2011 | Dunn | 474/138 |
| 2012/0312661 A1 | * | 12/2012 | Bianchini | 198/604 |

FOREIGN PATENT DOCUMENTS

DE    20 2004 021491 U1    6/2008

OTHER PUBLICATIONS

Search Report for Switzerland Application No. 1588/2013 filed on Sep. 16, 2013.

* cited by examiner

*Primary Examiner* — Gene Crawford
*Assistant Examiner* — Thomas Randazzo
(74) *Attorney, Agent, or Firm* — Notaro, Michalos & Zaccaria P.C.

(57) ABSTRACT

A clamping conveyor for transporting preforms for plastics containers by at least one clamping belt, the clamping conveyor having at least one tensioning unit with a tensioning roller over which the return strands of the at least one clamping belt are guided, a first force measuring apparatus for a force that acts on the tensioning roller, and a mechanical transmission device arranged within the clamping conveyor. The tensioning roller is operatively connected to the mechanical transmission device at least via a first cable element, the first force measuring apparatus being operatively connected to the mechanical transmission device via a second cable element and being coupled to an adjusting device for setting the force that acts on the tensioning roller.

15 Claims, 2 Drawing Sheets

CLAMPING CONVEYOR HAVING A TENSIONING APPARATUS

The invention relates to a clamping conveyor for transporting preforms for plastics containers by means of at least one clamping belt, the clamping conveyor having at least one tensioning unit for tensioning the at least one clamping belt.

A clamping conveyor which conveys preforms, in particular PET preforms, by means of a profiled clamping belt is known from EP 1 925 575 A1.

In the field of clamping conveyors, the requirement has recently arisen for a tensioning unit for the clamping belts of the clamping conveyor, it being possible with the aid of said tensioning unit for an operator to precisely set and read the force acting on the tensioning roller, without having to open the clamping conveyor.

It is therefore the object of the present invention to provide a clamping conveyor which has a mechanism by means of which the force that acts on the tensioning roller can be dissipated toward the outside and introduced from the outside in an easy and reliable manner.

In accordance with the present invention, this object is achieved by a clamping conveyor for transporting preforms for plastics containers by means of at least one clamping belt, the clamping conveyor having at least one tensioning unit with a tensioning roller over which the return strands of the at least one clamping belt are guided, a first force measuring apparatus for a force that acts on the tensioning roller, a mechanical transmission device arranged within the clamping conveyor, the tensioning roller being operatively connected to the mechanical transmission device at least via a first cable element, the first force measuring apparatus being operatively connected to the mechanical transmission device via a second cable element and being coupled to an adjusting device for setting the force that acts on the tensioning roller.

In a preferred embodiment of the present invention, the mechanical transmission device is configured in the manner of a block and tackle. As a result, it is possible to set the desired transmission ratio in an easy and efficient manner. According to the principle of the multiple block and tackle, (integer) transmission ratios of 1:2, 1:3, 1:4 or 1:5 can be realized. In principle, it is also conceivable for the mechanical transmission device to be configured in accordance with the principle of the two-armed lever. Thus, it is optionally also possible for non-integer transmission ratios to be set.

In a further preferred embodiment of the present invention, the block and tackle is configured in the form of a movable deflection pulley. The deflection pulley can in principle assume any desired shape and can be arranged freely or be guided within the clamping conveyor. Preferably, however, the deflection pulley is configured in the form of a slide guided on a guide device. The guide device can in this case consist of one or more bars on which the slide slides.

In a yet further preferred embodiment of the present invention, the first cable element is guided over a deflection roller which is arranged on the slide (for example on the top side thereof), and is secured in a stationary manner within the clamping conveyor (for example on the housing or the machine frame). In this way, the block and tackle principle can be realized in a particularly effective manner for the particularly preferred 1:2 transmission ratio.

In another preferred embodiment of the present invention, a second force measuring apparatus is arranged between the tensioning roller and the first cable element. This is generally a spring balance in order to be able to check the force acting at this point, too.

In yet another preferred embodiment of the present invention, the first force measuring apparatus and the adjusting device are arranged on an outer side of the clamping conveyor. The first force measuring apparatus is generally in the form of a dial balance in order to allow the operator to precisely read the force acting on the tensioning roller. The adjusting device is preferably configured such that a threaded shaft is secured to a suspension apparatus of the dial balance, it being possible for said threaded shaft to be moved by means of a tension nut with respect to a holding apparatus (for example a U-shaped profile) mounted fixedly on the outer side (or the housing) of the clamping conveyor.

In a further preferred embodiment of the present invention, the second cable element is guided to the movable slide over at least one deflection roller on an outer side of the clamping conveyor. In this way, the arrangement of the dial balance on the outer side of the clamping conveyor and the connection thereof to the mechanical transmission device can be achieved reliably in a structurally simple manner.

In yet another preferred embodiment of the present invention, the first cable element is guided to the movable slide over at least one deflection roller within the clamping conveyor. As a rule, on account of the spatial conditions within the clamping conveyor, two or three deflection rollers are required in order to connect the tensioning roller (or a rocker that guides the tensioning roller, cf. below) to the mechanical transmission device such that no interference or interactions with other components of the clamping conveyor arise.

In yet another preferred embodiment of the present invention, the tensioning roller is guided in a rocker. In this way, the tension of the clamping belt can be ensured in a particularly reliable manner. Preferably, the rocker furthermore has a jointed connection and a free end, the tensioning roller being arranged between the stationary roller and the free end of the rocker. This type of arrangement has been found to be particularly suitable for tensioning the clamping belt. In this embodiment the first cable element is operatively connected to the free end of the rocker rather than for instance directly to the tensioning roller. Preferably, a second force measuring apparatus is arranged between the first cable element and the free end of the rocker in order to provide a display of the acting force at this point, too.

In this case, a first lever arm is preferably formed between the jointed connection and the tensioning roller, and a second lever arm between the jointed connection and the free end (or a tension bolt arranged at the free end). As a result, a transmission possibility is once again created. Preferably, in this case, the second lever arm is approximately twice as long as the first lever arm—this again resulting in a transmission ratio of 1:2.

In other words, the force acting on the tensioning roller is twice as large as the force which acts on the free end of the rocker. Finally, the mechanical transmission device ensures that once again that force that acts on the tensioning roller is displayed on the first force measuring apparatus (i.e. the dial balance or parcel balance).

If for example 20 kg (or approximately 200 N) act on the tensioning roller, the spring balance (i.e. the second force measuring apparatus) would display 10 kg on the free end of the rocker and the dial balance (i.e. the first force measuring apparatus) would again display 20 kg on the outer side of the clamping conveyor.

By way of the present invention, precise reading and readjustment of the belt tension can thus be ensured. It is not necessary to open the housing of the clamping conveyor for this purpose.

Moreover, the present invention also comprises a tensioning unit for at least one belt of a clamping conveyor for preforms for plastics containers, having at least one tensioning roller over which the return strands of the at least one belt are guided, a first force measuring apparatus for a force that acts on the tensioning roller, a mechanical transmission device arranged within the clamping conveyor, the tensioning roller being operatively connected to the mechanical transmission device via a first cable element, the first force measuring apparatus being operatively connected to the mechanical transmission device via a second cable element and being coupled to an adjusting device for setting the force that acts on the tensioning roller.

An exemplary embodiment of the present invention is illustrated in the accompanying drawings in view of greater clarity.

Figure 1:
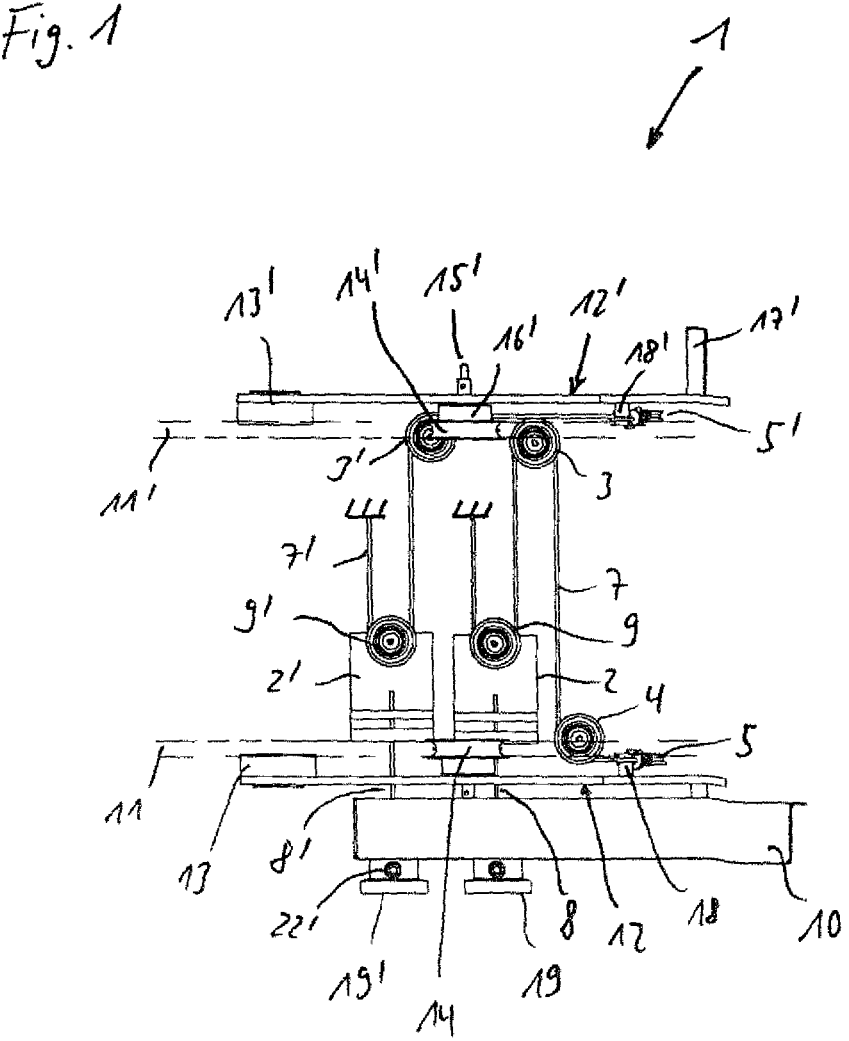
FIG. 1 shows a plan view of in particular the tensioning unit of a clamping conveyer according to the invention.

FIG. 1 illustrates the clamping conveyor 1 according to the invention, or the tensioning apparatus thereof, in a view from above. The two opposing clamping belts 11, 11' of the clamping conveyor 1, which are each guided over the associated tensioning rollers 14, 14', can be seen.

The tensioning rollers 14, 14' are each guided by a rocker 12, 12'. The rockers 12, 12' each comprise a jointed connection 13, 13' by way of which they are articulated for instance to the machine frame or to a part of the housing. The rockers 12, 12' furthermore comprise a handle 17, 17' which projects toward the outside and serves optionally for manual operation by an operator. The rockers 12, 12' each additionally comprise an inwardly directed tension bolt 18, 18' via which a force can be applied to the rockers 12, 12'.

The tensioning rollers 14, 14' are each mounted on the rocker 12, 12' by means of a pin 15, 15'. Furthermore, provision is made in each case of a spacer 16, 16' such that the tensioning rollers 14, 14' pass within the clamping conveyor 1 into the plane in which the clamping belts 11, 11' run.

Furthermore, the housing part 10 and the dial balances 19, 19' and also the tension nuts 22, 22', the function of which is described in detail below, can be seen. A first cable element 7, 7', which is guided—on that side of the clamping conveyor 1 that is remote from the dial balances 19, 19'—to the slide 2' or about a slide deflection roller 9' arranged on the slide 2' over a vertical deflection roller 5' and a horizontal deflection roller 3' (which are each arranged within the clamping conveyor 1), acts in each case on the tension bolt 18, 18' or on a spring balance 20, 20' suspended in each case on the tension bolt 18, 18'. The first cable element 7, 7' is finally secured to the machine frame or to a suitable part of the housing of the clamping conveyor 1.

On that side of the clamping conveyor 1 that faces the dial balances 19, 19', the first cable element 7 is guided to the slide 2 or about a slide deflection roller 9 arranged on the slide 2' over a vertical deflection roller 5 and two horizontal deflection rollers 3, 4 within the clamping conveyor 1 and is in turn secured to the machine frame or to a suitable part of the housing of the clamping conveyor 1. Furthermore, in each case one end of a second cable element 8, 8' is secured or firmly clamped to the slide 2, 2'. The function of the second cable element 8, 8' is explained in detail further below.

Figure 2:
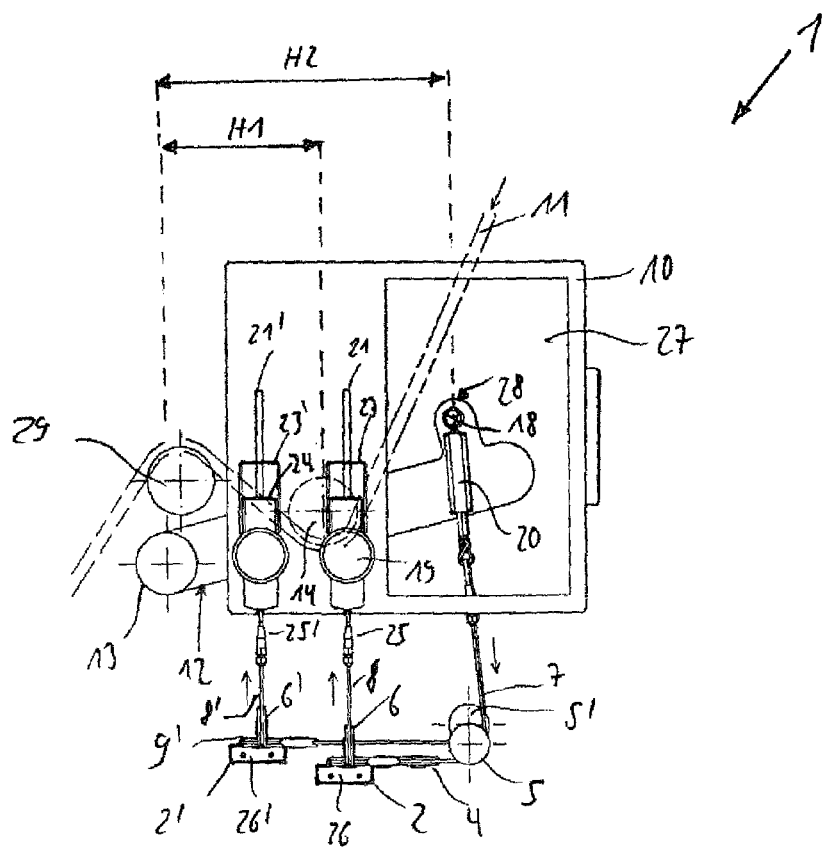
FIG. 2 shows a side view of in particular the tensioning unit of a clamping conveyer according to the invention.

FIG. 2 shows a side view, first of all, of the two lever arms H1 and H2 which are formed respectively between the jointed connection 13 and the tensioning roller 14 (H1) and between the jointed connection 13 and the free end 28 of the rocker 12 (H2)—or the tension bolt 18 arranged at the free end 28 of the rocker 12. The ratio of the lever arms H1:H2 is preferably 1:2. The manner in which the clamping belt 11 is guided over the tensioning roller 14 and over a stationary belt roller 29 can be seen. The manner in which in each case the second cable element 8, 8' is guided by the slides 2, 2' over vertical deflection rollers 6, 6' and is suspended on the dial balances 19, 19' by means of connecting pieces 25, 25' can furthermore be seen. The dial balances 19, 19' each have a suspension apparatus 24, 24' to which a threaded shank 21, 21' is secured. The threaded shank 21, 21' is guided in each case through a U-shaped profile 23, 23' fixed to the housing part 10 and is mounted on the U-shaped profile 23, 23' in an adjustable manner via a tension nut 22, 22'.

Moreover, in the inspection window 27 of the housing part 10 it is possible to see once again the free end 28 of the rocker 12 with the tension bolt 18 and also the spring balance 20 suspended on the tension bolt 18 and also the first cable element 7 suspended on the spring balance 20. The slides 2, 2' are preferably guided, as indicated in the present case in FIG. 2, on guide bars 26, 26'.

Figure 3:
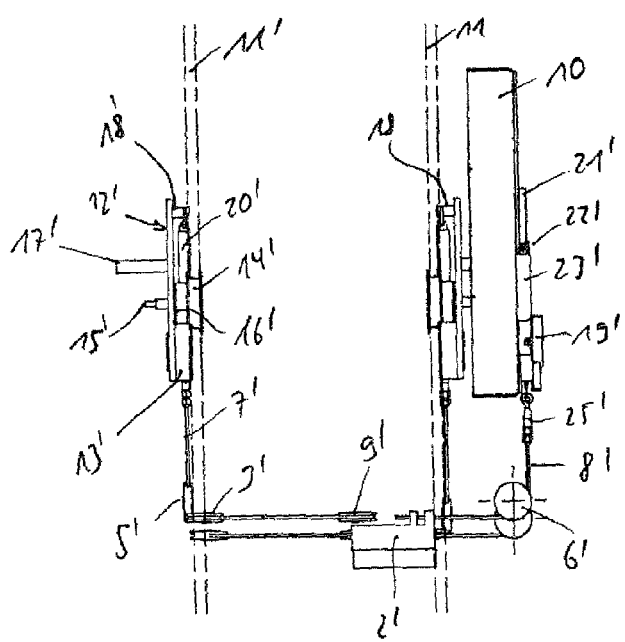
FIG. 3 shows a front view of in particular the tensioning unit of a clamping conveyer according to the invention.

In the front view according to FIG. 3, it is in particular possible to see once again the slide deflection roller 9' which is arranged on the slide 2' and from which the first cable element 7' extends over the horizontal deflection roller 3' and over the perpendicular deflection roller 5' to the spring balance 20' suspended on the tension bolt 18'.

The second cable element 8' secured or firmly clamped to the slide 2' is in turn guided over the vertical deflection roller 6'—which is generally secured to an outer side of the clamping conveyor (not shown here)—and suspended on the dial balance 19' via the connecting piece 25'.

The adjustment of the clamping conveyor according to the invention is described once again in detail in the following text.

The tension of the clamping belts 11, 11' can be set by the operator from the outside, i.e. without the housing part 10 or the inspection window 27 having to be opened. By tightening the tension nut 22, 22', the dial balance 19, 19' is moved upward via its suspension 14, 14', and via the second cable element 8, 8' suspended thereon the corresponding tensile force FZ is applied to the slide 2, 2'. Here—depending on the point of view—a step up or step down takes place. By means of the slide deflection roller 9, 9' which is mounted on the slide 2, 2', half the tensile force FZ/2 is transmitted to the rocker 12, 12' via the first cable element 7, 7', and can be read by the operator optionally at the spring balance 20, 20'. The other half of the tensile force FZ is conducted into the machine frame or the housing on account of the fixing of the first cable element 7, 7'. Within the rocker 12, 12', on account of the (preferred) lever arm ratio H1:H2=1:2, a step up or step down once again takes place and the entire original tensile force FZ is again applied to the tensioning roller 14, 14'. In this way, the operator can precisely set and read—from the outside—that force that actually acts on the tensioning roller 14, 14'.

If for instance in another embodiment the first cable element 7, 7' is secured directly to the tensioning roller 14, 14' (if for example there is no rocker), then the operator can provide the necessary tensile force—again from the outside—by setting twice the value at the dial balance 19, 19'. In other words, in such an embodiment, the operator has to convert the tensile force set at the dial balance 19, 19'. This would also apply in an analogous manner to other, optionally non-integer, step-up or step-down ratios.

LIST OF REFERENCE SIGNS

1 Clamping conveyor
2, 2' Slide
3, 3' Inner deflection roller, (horizontal)
4 Additional inner deflection roller (horizontal)
5, 5' Inner deflection rollers (vertical)
6, 6' Outer deflection rollers (vertical)
7, 7' First cable element
8, 8' Second cable element
9, 9' Slide deflection roller
10 Housing part
11, 11' Clamping belt
12, 12' Rocker
13, 13' Jointed connection
14, 14' Tensioning roller
15, 15' Pin
16, 16' Spacer
17, 17' Handle
18, 18' Tension bolt
19, 19' Dial balance (first force measuring apparatus)
20, 20' Spring balance (second force measuring apparatus)
21, 21' Threaded shaft
22, 22' Tension nut
23, 23' U-shaped profile
24, 24' Suspension apparatus
25, 25' Connecting piece
26, 26' Guide bars
27 Inspection window
28, 28' Free end (rocker)
29, 29' Stationary belt roller
H1 First lever arm
H2 Second lever arm

The invention claimed is:

1. A clamping conveyor for transporting preforms for plastics containers by means of at least one clamping belt, the clamping conveyor having at least one tensioning unit with
a tensioning roller (14, 14') over which the return strands of the at least one clamping belt (11, 11') are guided,
a first force measuring apparatus (19, 19') for a force that acts on the tensioning roller (14, 14'),
a mechanical transmission device (2, 2'; 9, 9') arranged within the clamping conveyor (1),
the tensioning roller (14, 14') being operatively connected to the mechanical transmission device (2, 2'; 9, 9') at least via a first cable element (7, 7'),
the first force measuring apparatus (19, 19') being operatively connected to the mechanical transmission device (2, 2'; 9, 9') via a second cable element (8, 8') and being coupled to an adjusting device (21, 21'; 23, 23') for setting the force that acts on the tensioning roller (14, 14').

2. The clamping conveyor as claimed in claim 1, wherein the mechanical transmission device (2, 2'; 9, 9') is configured in the manner of a block and tackle.

3. The clamping conveyor as claimed in claim 2, wherein the block and tackle is configured in the form of a movable deflection pulley.

4. The clamping conveyor as claimed in claim 3, wherein the deflection pulley is configured in the form of a slide (2, 2') guided on a guide device (26, 26').

5. The clamping conveyor as claimed in claim 4, wherein the first cable element (7, 7') is guided over a deflection roller (9, 9') which is arranged on the slide (2, 2'), and is secured in a stationary manner within the clamping conveyor (1).

6. The clamping conveyor as claimed in claim 1, wherein a second force measuring apparatus (20, 20') is arranged between the tensioning roller (14, 14') and the first cable element (7, 7').

7. The clamping conveyor as claimed in claim 1, wherein the first force measuring apparatus (19, 19') and the adjusting device (21, 21'; 23, 23') are arranged on an outer side of the clamping conveyor (1).

8. The clamping conveyor as claimed in claim 1, wherein the second cable element (8, 8') is guided to the movable slide (2, 2') over at least one deflection roller (6, 6') on an outer side of the clamping conveyor (1).

9. The clamping conveyor as claimed in claim 1, wherein the first cable element (7, 7') is guided to the movable slide (2, 2') over at least one deflection roller (3, 3'; 4; 5, 5') within the clamping conveyor (1).

10. The clamping conveyor as claimed in claim 1, wherein the tensioning roller (14, 14') is guided in a rocker (12, 12').

11. The clamping conveyor as claimed in claim 10, wherein the rocker (12, 12') furthermore has a jointed connection (13, 13') and a free end (28, 28'), the tensioning roller (14, 14') being arranged between the jointed connection (13, 13') and the free end (28, 28') of the rocker (12, 12').

12. The clamping conveyor as claimed in claim 11, wherein the first cable element (7, 7') is operatively connected to the free end (28, 28') of the rocker (12, 12').

13. The clamping conveyor as claimed in claim 12, wherein a second force measuring apparatus (20, 20') is arranged between the first cable element (7, 7') and the free end (28, 28') of the rocker (12, 12').

14. The clamping conveyor as claimed in claim 11, wherein a first lever arm (H1) is formed between the jointed connection (13, 13') and the tensioning roller (14, 14'), and wherein a second lever arm (H2) is formed between the jointed connection (13, 13') and the free end (28, 28').

15. The clamping conveyor as claimed in claim 14, wherein the second lever arm (H2) is approximately twice as long as the first lever arm (H1).

* * * * *